United States Patent [19]

Westwood

[11] Patent Number: 4,647,997
[45] Date of Patent: Mar. 3, 1987

[54] AERODYNAMIC LATCH FOR DISK FILE ACTUATOR

[75] Inventor: Donald C. Westwood, Cupertino, Calif.

[73] Assignee: Plus Development Corporation, Milpitas, Calif.

[21] Appl. No.: 728,674

[22] Filed: Apr. 29, 1985

[51] Int. Cl.⁴ .................... G11B 5/54; G11B 21/02; G11B 21/22
[52] U.S. Cl. .................................. 360/105; 360/75; 360/86; 360/98; 360/103
[58] Field of Search .................. 360/105, 102–103, 360/109, 97–99, 133, 137, 75, 86

[56] References Cited

U.S. PATENT DOCUMENTS

| | | | |
|---|---|---|---|
| 4,371,903 | 2/1983 | Lewis | 360/105 X |
| 4,375,070 | 2/1983 | Isozaki et al. | 360/105 X |
| 4,535,374 | 8/1985 | Anderson et al. | 360/103 |
| 4,538,193 | 8/1985 | Dimmick et al. | 360/137 |
| 4,562,500 | 12/1985 | Bygdnes | 360/98 X |

FOREIGN PATENT DOCUMENTS 0175839  4/1986  European Pat. Off. .

OTHER PUBLICATIONS

E. Lennemann, "Aerodynamic Aspects of Disk Files", *IBM J. Res. Develop.*, Nov. 1974, pp. 480–488.

*Primary Examiner*—John H. Wolff
*Attorney, Agent, or Firm*—David B. Harrison

[57] ABSTRACT

An aerodynamically powered release latch mechanism for a fixed disk data file is disclosed. An airflow generator disk is commonly journalled with a single data storage disk for generating airflow in an enclosed chamber. A latch is journalled for rotation relative to a base casting and has an axis of rotation spaced a predetermined distance away from the periphery of the data storage disk. The latch includes a vane movably disposed in a space defined between the airflow generator disk and the data storage disk so as to be deflected by airflow generated by rotation thereof. A releasable engagement mechanism engages a rotary actuator assembly in a locking position in the range of relative movements therebetween whenever airflow is insufficient to deflect the vane. A bias spring is operable between the latch and the base casting for maintaining the engagement mechanism in locking position in the absence of airflow.

13 Claims, 2 Drawing Figures

AERODYNAMIC LATCH FOR DISK FILE ACTUATOR

BACKGROUND OF THE INVENTION

The present invention relates to latches for releasably locking disk file actuator assemblies at a fixed position during power down conditions to prevent damage to data storage disks having magnetic storage media coated or deposited thereon. More particularly, the present invention relates to an improved latch for a disk file actuator assembly which release automatically in response to aerodynamic force generated by rotation of the storage disk.

REFERENCE TO RELATED REFERENCES

The following reference documents are pertinent to the present invention:

(1) U.S. patent application Ser. No. 06/439,897, filed on Nov. 8, 1982, for Aerodynamically Released Safety Latch For Data Transducer Assembly In Rotating Rigid Disk Storage Device, now U.S. Pat. No. 4,538,193.

(2) U.S. patent application Ser. No. 06/654,507, filed on Sept. 26, 1984, for Data Transducer Restraint, William G. Moon, Joel N. Harrison and David A. Brown—Inventors, Plus Development Corporation, assignee, now abandoned, but see European Patent Office specification No. 0 175 839, published on Apr. 2, 1986.

Airflow is generated incident to the rotation of data storage disks of a disk file. The characteristics of this airflow have been analyzed and previously reported by E. Lennemann in the *IBM Journal of Research and Development*, November 1974, pages 480–488. It is known that two commonly mounted, spaced apart rotating disks generate a significantly greater airflow than is generated by a single rotating disk, Id., FIG. 3. The amount of airflow is also known to be a function of disk diameter and angular velocity. The airflow force is greatest adjacent the periphery of the rotating disk and falls off rapidly as a non-linear function as one moves away from the disk periphery.

In rotating, non-removable disk data storage devices ("disk drives"), a data read/write transducer, usually in the form of a very hard ferrite head, "flys" upon an air cushion or bearing in very close proximity to the data surface. In some disk drives, the ferrite head lands upon and takes off from any particular data track. This landing and taking off activity has led to soft and hard data failures, due to erosion or scarring of the magnetic film coating on the disk surface. In addition, the hard ferrite head may dent the disk surface in response to sharp jarring forces attributable to rough handling of the drive during, e.g. installation and removal from the host computer equipment or while the equipment is in transit.

Consequently, many disk drive designs provide for a "landing zone" outside of the useful data storage area of the disk. Such drives latch the transducer carriage to keep the ferrite head transducers at their landing zones whenever contact is made with the disk surface. If damage results, it results to an area not devoted to data storage and retrieval activities. In accordance with the referenced U.S. patent application Ser. No. 06/439,897, it is known to harness the airflow generated by rotation of a plurality of stacked disks of a disk file, in order to release a passive, spring-loaded aerodynamically responsive shipping latch.

While the aerodynamically actuated latch described in the referenced U.S. patent application Ser. No. 06/439,897 worked well within the environment of a multiple, stacked rotating 5¼ inch diameter data storage disk file, the principles thereof were found to be inoperable in the case of a miniaturized (95 mm diameter) single data disk system. First, the small single disk was found to generate airflow values which were too small in magnitude to operate and release any latch which effectively restrained the transducer actuator assembly to the landing zone in the absence of disk rotation (airflow). Second, placement of the vane structure as disclosed in the said patent application Ser. No. 06/439,897 very close to the periphery of the rotating disk stack failed to develop nearly enough torque in response to the small magnitude of airflow which is generated by rotation of the very small (95 mm) disk.

Thus, a hitherto unsolved need has arisen in a miniaturized, single fixed disk drive for generation of sufficient airflow to release an aerodynamically responsive data transducer restraining latch mechanism.

SUMMARY AND OBJECTS OF THE INVENTION

A general object of the invention is to overcome the limitations and drawbacks of prior art aerodynamically operated latches for transducer actuator assemblies in a disk drive having but a single rotating non-removable data storage disk.

Another object of the present invention is to provide an effective aerodynamic transducer latch mechanism within the confines of a miniaturized disk drive structure.

A further object of the present invention is to combine a very low cost, low mass non-storage airflow generator disk with a single data storage disk in order to increase airflow to a usable level for an aerodynamically powered latch mechanism for a head carriage assembly.

One more object of the present invention is to offset the journal of an airflow latch from the periphery of a rotating disk as far as mechanically practicable within the confines of a miniaturized disk file to maximize mechanical advantage in the latch in response to airflow concentrated at the periphery of the rotating disk.

Yet another object of the present invention is to combine a data transducer restraint surface within the structure of a very low cost non-storage airflow generator disk in a miniaturized disk drive system.

Still one more object of the present invention is to closely shroud a rotating fixed data storage disk and a commonly mounted, spaced apart airflow generator disk and to define an airflow path occupied by a rigid rotatable flag portion of an aerodynamically powered shipping latch in order to concentrate generated airflow in the airflow path to maximize resultant torque developed in the latch structure.

Yet one more object of the present invention is to provide an aerodynamically powered shipping latch which includes a rigid vane portion which follows the inside contour of the disk shroud, thereby facilitating unobstructed installation of the rotating data storage disk during drive assembly.

An aerodynamically powered release latch mechanism incorporating the principles of the present invention is included within a miniaturized, single fixed disk data file which includes a base casting defining a chamber, a single data storage disk in the chamber and journalled for rotation relative to the base casting by a spindle motor. A transducer actuator assembly is mounted in the chamber and supports data transducer heads in close proximity to major data storage surfaces of the disk and moves the heads among selected ones of a multiplicity of annular concentric data track locations on the surfaces. A cover is mounted to the base casting to enclose the chamber.

The innovative latch mechanism includes an airflow generator disk commonly journalled with the data storage disk in a spaced apart relationship; and, together they generate airflow during rotation. A latch is journalled for rotation relative to the base casting and has an axis of rotation spaced a predetermined distance away from the periphery of the data storage disk. The latch includes a vane movably disposed in a space between the airflow generator disk and the data storage disk and may further include a rigid flag portion disposed in an airflow channel defined by the base casting the disks and the actuator. The vane and flag portion are deflected by airflow and thereby move the latch. A releasable engagement member formed on the latch is released from engagement with the actuator assembly when airflow deflects the vane and flag portion. A bias clock spring operates between the base casting and the latch to retain the engagement member in engagement with the actuator assembly in the absence of airflow sufficient to generate a torque in the latch to overcome the bias force. Preferably, the vane is shaped to follow the contour of the interior disk shroud providing sidewall of the base casting.

These and other objects, advantages and features of the present invention will be better understood and appreciated from a throughtful consideration of the following detailed description of a preferred embodiment presented in conjunction with the accompanying drawings.

DETAILED DESCRIPTION OF A PREFERRED EMBODIMENT

Figure 1:
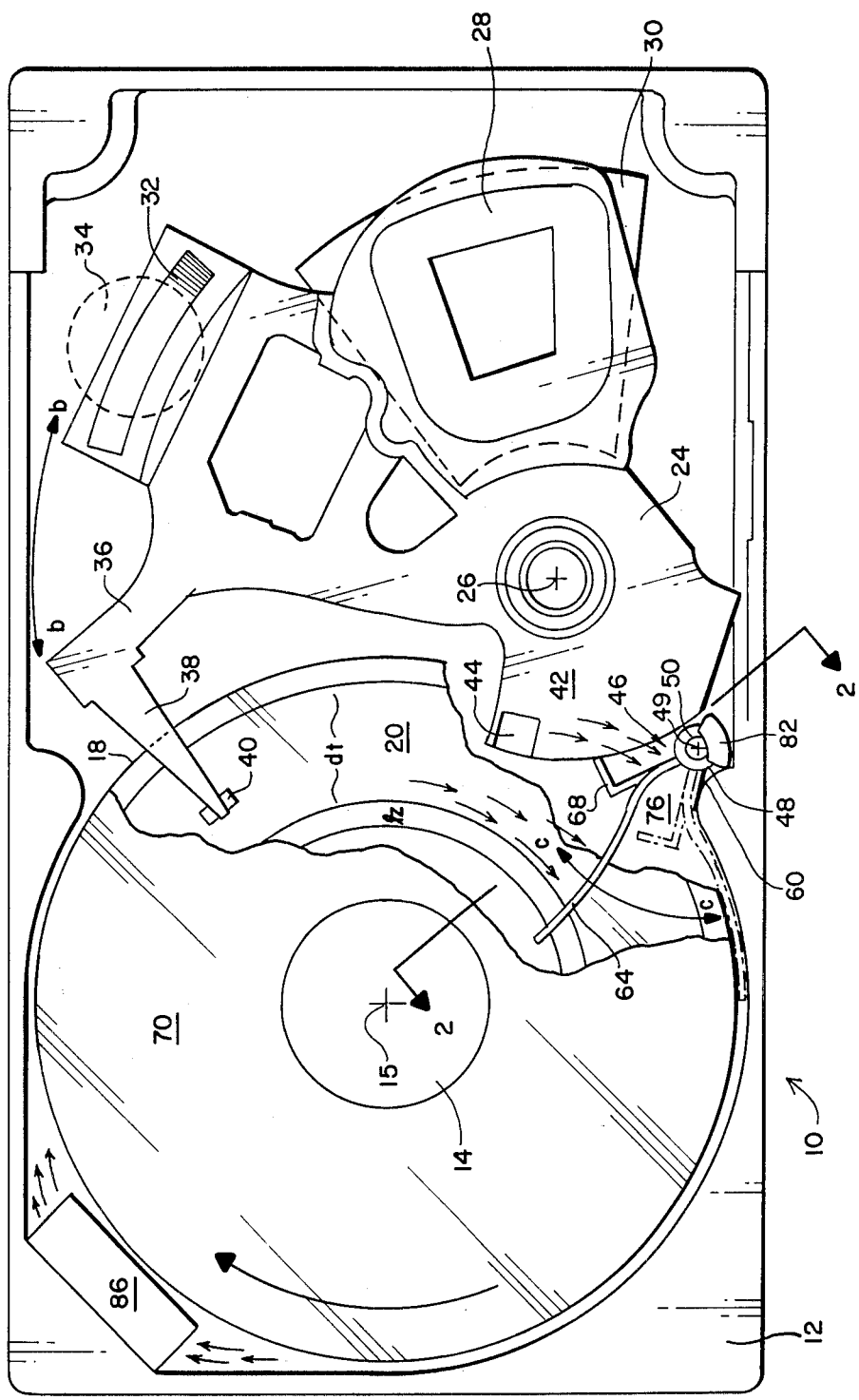
FIG. 1 is a somewhat diagrammatic enlarged top plan view of a miniaturized disk data file incorporating the principles of the present invention. Portions of the illustrated structure are broken away and the cover is removed so as to facilitate illustration of the salient operating principles of the file.
Figure 2:
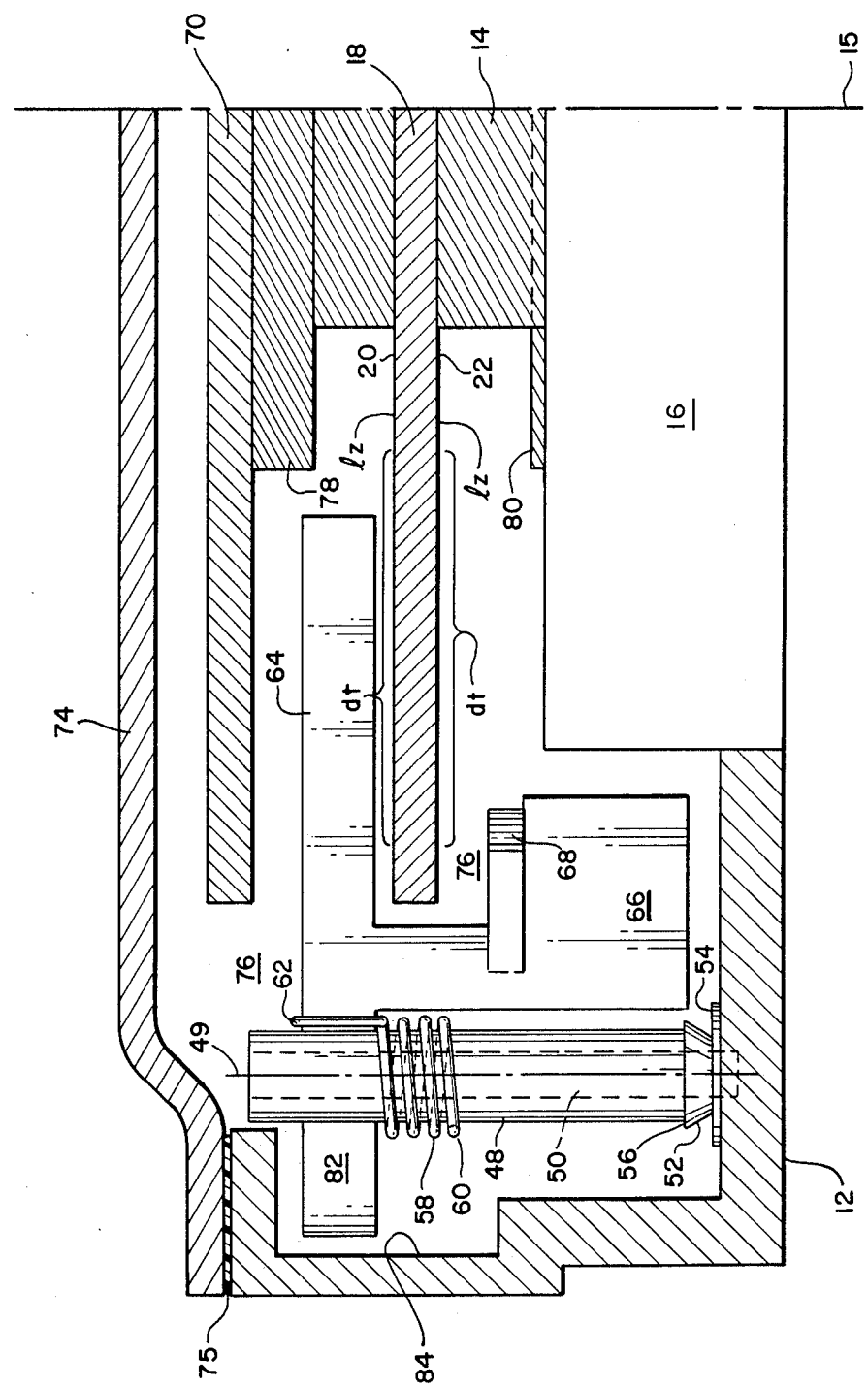
FIG. 2 is a side view in elevation and section of a portion of the structure illustrated in FIG. 1, the section being taken along the line 2—2 in FIG. 1.

A miniaturized fixed disk data file mechanism 10 which incorporates the principles of the present invention is illustrated in the enlarged plan view of FIG. 1. The mechanism 10 includes a unitary base casting 12, a disk spindle 14 having an axis of rotation 15 and being coupled directly to an electronically commutated brushless DC spindle motor 16 (FIG. 2). A single data storage disk 18 is mounted to the spindle 14 and is rotated in a clockwise direction, as indicated by the arrow A about the axis 15, by the spindle motor 16 at a predetermined proper angular velocity. The data storage disk 18 provides two major data storage surfaces, an upper surface 20 and a lower surface 22. The surfaces are characterized by the presence of suitable magnetic storage media which may be ferrous material oxides, or other materials which are coated, plated or deposited by sputtering as is known in the art.

The disk 18 in the miniaturized mechanism 10 is preferably about 95 millimeters in diameter, and the mechanism 10 is capable of storing approximately ten megabytes of formatted user data on the surfaces 20, 22 of the single disk 18.

A rotary actuator assembly 24 is bidirectionally rotatably journalled to the base casting 12 about an axis of rotation 26. The actuator 24 rotates bidirectionally in a range of movement along an arc of approximately 30 degrees, as indicated by the arrow b—b in FIG. 1. The actuator 24 includes a coil 28 adjacently overlying a premagnetized permanent magnet 30, a microlined scale 32 for a position-sensing optical encoder assembly 34 mounted to the base casting 12, and a transducer support arm 36 which supports two vertically aligned "Whitney" transducer struts 38 which terminate in two head slider assemblies 40 of the so-called "Winchester" or flying head type which fly as close as 15 micro inches above the data surfaces on an air bearing or cushion resulting from disk rotation. The actuator assembly 24 further includes a counterweight 42 which defines a notch 44 in a periphery thereof adjacent to a latch 46.

Each data storage surface 20, 22 is characterized by a multiplicity of e.g. 612 concentric annular data tracks. An inner landing zone 1z is devoted to landing and take off of the flying head slider assemblies 40.

The latch 46 comprises a cylindrical shaft 48 having an axis of rotation 49 and which is journalled to a post 50 fixed to the base casting 12. The shaft 48 is chamfered at its lower end 52 to reduce the diameter of the bottom surface which bears upon a Teflon (tm) bushing 54 so as to minimize rotational frictional torque. A flange 56 extends outwardly from the chamfer 52 in order to retain a clock spring 58 around the shaft 48 during the manufacturing and assembly process. In addition, the flange retains the spring in the event of a shock to the drive. The spring 58 includes a lower lineal end 60 which bears upon the inner wall of the base casting 12 as shown in FIG. 1. An upper U-shaped vertical portion 62 of the spring 58 hooks over a vane 64 integrally formed with the shaft 48 and extending radially outwardly therefrom along an arc which conforms to the arc of the interior sidewall of the base casting, as shown in FIGS. 1 and 2. The spring 58 applies a reverse bias force of approximately 0.3 gm-cm to the latch 46 to urge the vane 64 toward the counterweight 42 of the rotary actuatory assembly 24.

The vane 64 includes a downwardly depending rigid flag 66 also integrally formed with the vane 64 and shaft 48 (from a suitably formable lightweight, low friction plastic material). The flag 66 is disposed in an airflow channel 76 adjacent the periphery of the data disk 18 and formed by the base casting 12 and spindle motor 16 as shown in FIG. 2. A latching finger 68 extends from the top of the flag 66 toward the actuator counterweight 42 and engages the notch 44 thereof when the actuator assembly 24 positions the transducers 40 over the landing zones 1z.

An airflow generator disk 70, preferably of lightweight plastic molded to an aluminum hub, is secured at its hub to the spindle 14 and is spaced above the data storage disk 18 by a predetermined distance, e.g. approximately four millimeters, thereby defining a gap in which the vane 64 is placed and operates.

The airflow disk 70 rotates in a plane which is parallel to the plane of rotation of the data storage disk 18; and, both disks 70 and 18 generate the airflow which is required to move the vane in the counter-clockwise direction indicated by the arrow C in FIG. 1. Little arrows in FIG. 1 illustrate the airflow resulting from the disks' rotation. A cover 74 encloses the interior chamber defined by the base casting 12 and closely shrouds the air generator disk 70, thereby confining and directing the airflow to the peripheral channel region, generally denoted by the reference numeral 76. A gasket 75 between the periphery of the base casting 12 and the cover 74 provides an air tight seal. With the components and configuration for the latch 46 as illustrated and described herein, a torque of 0.8 gm-cm (approximately) results from the generated airflow.

One optional but highly advantageous feature which is readily included within the disk file mechanism 10 is a data transducer restraint, in accordance with the teachings of the earlier referenced U.S. patent application Ser. No. 06/654,507. One implementation of the data transducer restraint mechanism is achieved by providing two disks 78, 80 as shown in FIG. 2. These two disks overly the landing zones lz of the data surfaces 20, 22 by a precise predetermined distance, e.g. 2.34 millimeters, so that the data transducers 40 are physically restrained by the disks 78, 80 and are thereby prevented from damaging the landing zones. Although the restraint disks 78, 80 are indicated as discrete from the spindle 14 and airflow disk 70 respectively, it is apparent that they may be formed as integral flanged extensions and surfaces thereof.

A latch counterbalance 82 is provided on the latch shaft 48 as shown in FIGS. 1 and 2. The counterbalance 82 desensitizes the latch 46 from all linear shock impulses, leaving the latch 46 sensitive only to certain torque impulses to which the actuator assembly 24 is also sensitive. By making the latching finger 68 sufficiently long, and by realizing that the radial distance between the latching finger 68 and the axis of rotation of the latch shaft 48 is much less than the radial distance between the notch 44 and the axis of rotation 26 of the rotary actuator assembly 24, the assembly 24 will remain latched even under the influence of a severe clockwise impulse torque which operates equally upon the actuator assembly 24 and upon the latch 46.

Since the vane 64 conforms to the adjacent sidewall 84 of the base casting 12, and since there is sufficient clearance between the sidewall 84 and the data disk 18, the latch 46 may be installed in the disk mechanism 10 during disk file assembly before the data disk 18 is installed.

In the assembly process the spindle motor 16 is mounted and sealed to the base casting. Then, the rotary actuator assembly 24 is installed on its journal. Next, the latch 46 is installed; and, it is rotated clockwise until the vane 64 lies against the sidewall region 84 (as shown by the broken line position in FIG. 1), thereby enabling the data disk 18 to pass by and be installed. Next, the airflow generator disk 70 is installed; and, once all other components, such as the optical encoder 34, are installed and wired, the mechanism is sealed closed by the cover 74. All of these assembly operations occur in a "clean" area such as a clean room or clean tunnel wherein particulate contamination is kept minimal.

In the event that contaminating particles become entrained inside of the mechanism 10, a suitable micropore filter 86 is provided to remove them. The filter 86 is located adjacent the peripheries of the data disk 18 and airflow generator disk 70 where airflow is maximum. Thus, the filter 86 is directly within the airflow patch generated inside of the file mechanism 10 by rotation of the disks 18 and 70.

When power is removed from the mechanism 10, kinetic energy stored in the rotating disks and spindle is converted to electricity by the spindle motor 16 acting as a generator. The electrical energy so produced is then applied to the rotary actuator 24 so that it transports the transducer 40 to the landing zone lz, whereupon the latch finger 68 engages the notch 44 formed in the actuator counterweight 42, thereby latching the data transducer 40 at the landing zone position. When power to the mechanism 10 is once again applied, air currents generated by rotation of the disks 18 and 70 impact upon the vane 64 and flag 66, causing the latch 46 to rotate counterclockwise along its arc of movement c—c. Once the finger 68 has cleared the notch 44, the actuator 24 is free to move about its locus of rotation b—b.

Having now described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

I claim:

1. An aerodynamically powered release latch mechanism for a fixed disk data file which includes a base casting defining an interior chamber, a single data storage disk in said chamber and journalled for rotation relative to said base casting by spindle motor means, a transducer actuator assembly in said chamber for supporting data read/write transducer heads in close proximity to major data storage surfaces of said disk and for moving said heads among selected ones of a multiplicity of concentric data track locations on said surfaces and to and from a landing zone location, and a cover mounted to said base casting to enclose said chamber, said latch mechanism comprising:
   airflow generator disk means commonly journalled with said data storage disk in a spaced apart relationship for generating airflow in said chamber with said data storage disk during rotation thereof,
   latch means journalled for rotation relative to said base casting and having an axis of rotation spaced a predetermined distance away from the periphery of said data storage disk, said latch means including a vane moveably disposed in a space defined between said airflow generator disk means and said data storage disk so as to be deflected by airflow generated by rotation thereof, said latch further including releasable engagement means for engaging said transducer actuator assembly in a locking position defined when said transducer actuator assembly positions the data read/write transducer heads adjacent to the landing zone location whenever airflow is insufficient to deflect said vane,
   bias spring means operable between said latch means and said base casting for maintaining said engagement means in said locking position in the absence of airflow.

2. The release latch mechanism set forth in claim 1 wherein said latch means further comprises a rigid flag portion in alignment with said vane and disposed adjacent the peripheral edge of at least one of said airflow generator disk means and said data storage disk.

3. The release latch mechanism set forth in claim 1 wherein said transducer actuator assembly comprises a rotary actuator assembly and includes counterweight means disposed adjacent to said latch means, wherein said latch means includes a counterbalance, and wherein said releasable engagement means engages a notch defined by said counterweight means.

4. The release latch mechanism set forth in claim 3 wherein the distance between the axis of rotation of said latch means and said releasable engagement means is less than the distance between an axis of rotation of said rotary actuator assembly and said notch defined by said counterweight means.

5. The release latch mechanism set forth in claim 1 wherein said latch is journalled to said base casting at a location spaced away from the peripheries of said airflow generator disk means and said data storage disk so as to increase the response of said vane to airflow present at said peripheries.

6. The release latch mechanism set forth in claim 1 wherein the diameters of said airflow generator disk means and said data storage disk are less than 100 millimeters.

7. The release latch mechanism set forth in claim 1 wherein said base casting and said cover closely shroud said airflow generator disk means and said data storage disk so as to define an airflow channel to concentrate said airflow in the vicinity of said latch means.

8. The release latch mechanism set forth in claim 7 wherein said latch means further comprises a rigid flag portion in alignment with said vane and disposed within said channel.

9. The release latch mechanism set forth in claim 1 wherein said vane is contoured to the inside wall contour of said base casting defining said chamber so that said data storage disk may pass by said vane during manufacturing operations.

10. An aerodynamically powered release latch mechanism for a thin and compact head and disk assembly of a fixed rotating disk data storage device including a base having an integral bottom wall and sidewalls defining an interior space, a brushless direct current electronically commutated spindle motor mounted to the base casting through an opening defined in the bottom wall of the base casting, two adjacently spaced apart rotatable disks mounted to a spindle of the spindle motor with at least one of the disks being a data storage disk for storing useful data in a plurality of concentric data tracks on a data surface thereof and both of the disks having diameters less than 100 millimeters, at least one data transducer for writing and reading data on said data surface, an electromagnetic transducer actuator structure mounted in said interior space to said base for moving said data transducer to each selected data track and from and to a landing zone location on said disk at which said data transducer is intended to come into contact therewith in the absence of disk rotation, and a cover mounted to the base for enclosing the interior space, the aerodynamically powered release latch mechanism comprising a latch in said interior space and including:

a shaft rotatably journalled to said base, a single curvilinear elongated scoop-like airvane integrally formed with and radially extending from said shaft and including a curved portion disposed in a space between said disks in a first, non-airflow position at which the end of the vane opposite the shaft is generally adjacent to the spindle, the curved portion following the contour of an inside arced portion of a sidewall adjacent to the disks so that the airvane may be moved out of the space between the disks to enable an inner one of the two disks to be inserted onto the spindle during manufacture of the head and disk assembly, and having a concave surface facing the direction of airflow generated by rotation of the disks, and a latching finger for releasably engaging and thereby latching the transducer actuator assembly when the latch is oriented at the first, non-airflow position and for releasing the actuator as the airvane moves the latch away from the first, non-airflow position in response to airflow generated by rotation of the disks by the spindle motor, the mechanism further comprising bias force means for biasing the latch to the first, non-airflow position in the absence of airflow, and counterweight means for desensitizing the latch from linear shock impulses.

11. The mechanism set forth in claim 10 wherein the latch further comprises an integrally formed lower flag portion generally aligned and extending in the direction of the airvane portion and located in an airflow channel defined by the bottom and sidewall of the base adjacent the latch and by the spindle motor and by the lower surface of the inner one of the two disks.

12. The mechanism set forth in claim 10 wherein said electromagnetic transducer actuator structure comprises a rotary electromechanical voice coil actuator journalled to the bottom wall of the base and including a rotatable counterweight located generally adjacent to the latch mechanism and wherein the latching finger of the mechanism engages a peripheral slot defined in said counterweight.

13. The mechanism set forth in claim 10 wherein an outer one of said two disks comprises a non-data storage airflow generator disk.

* * * * *